Jan. 18, 1955    H. L. WALBORN    2,699,858
DIAL OPERATED ELECTRIC TYPEWRITER
Filed March 5, 1952    3 Sheets-Sheet 3
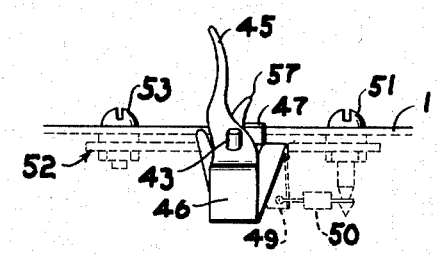
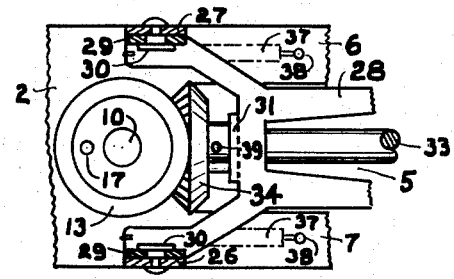
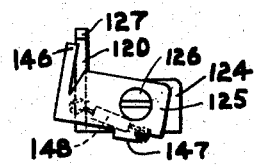
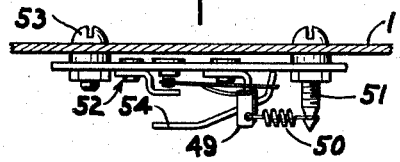
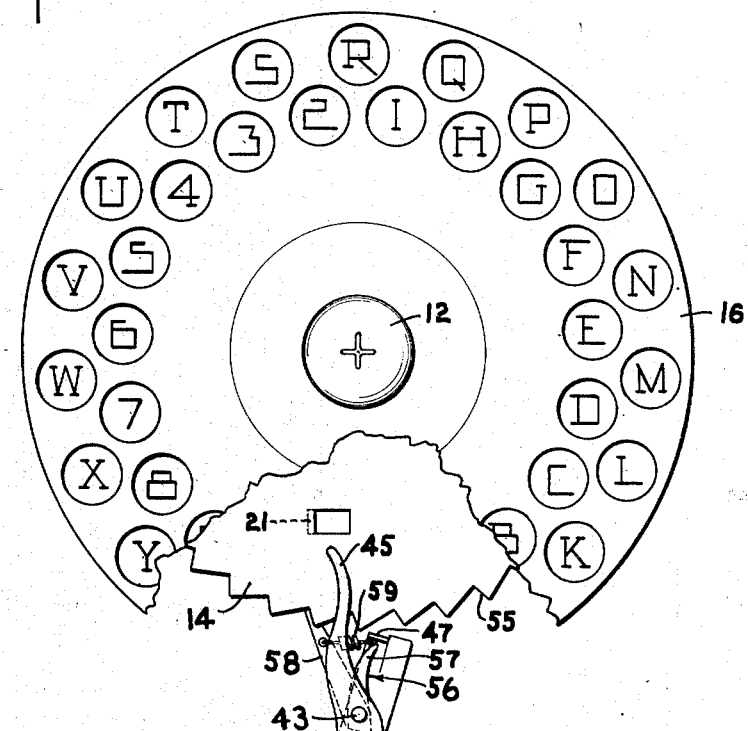
INVENTOR
H. L. Walborn
BY Roy A. Plant
ATTORNEY

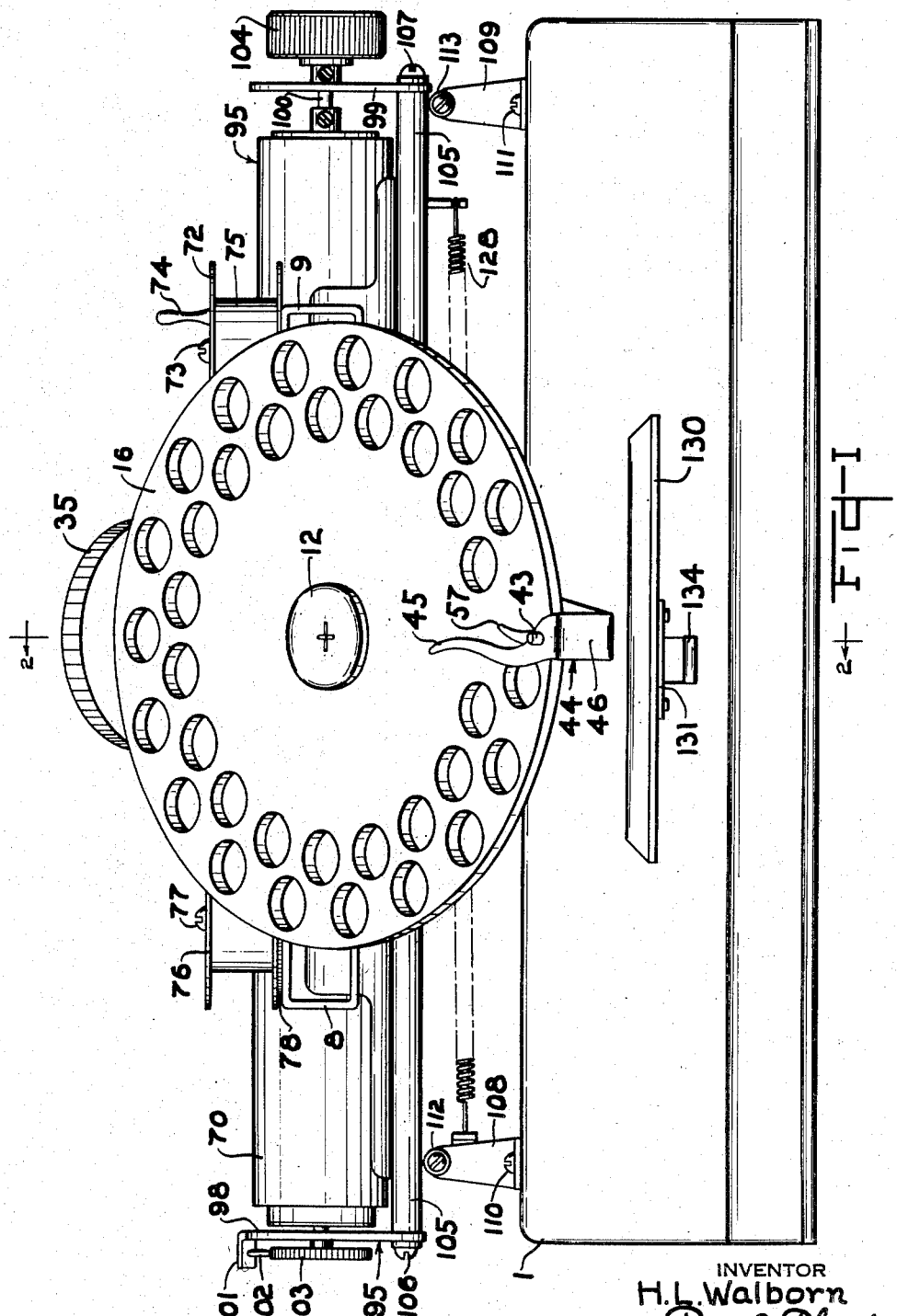

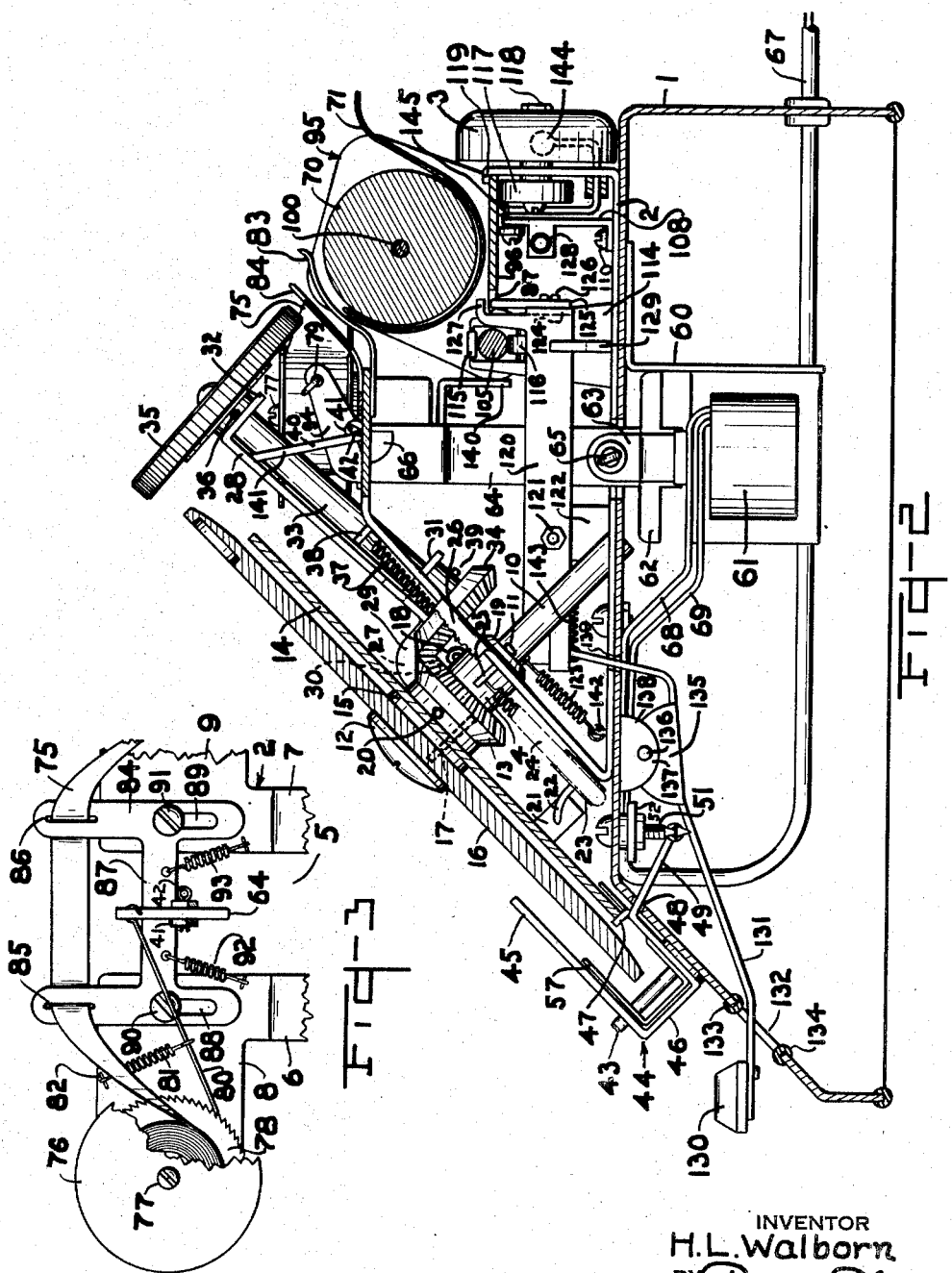

United States Patent Office 2,699,858
Patented Jan. 18, 1955

2,699,858

DIAL OPERATED ELECTRIC TYPEWRITER

Horace L. Walborn, Jackson, Mich., assignor to Dialrite Associates, Battle Creek, Mich.

Application March 5, 1952, Serial No. 274,849

20 Claims. (Cl. 197—47)

The present invention relates broadly to typewriting devices, and in its specific phases to an electric toy typewriter.

Toy typewriters, in the past, have universally been made of the mechanically operated type wherein the typing pressure exerted by the finger of a child using the typewriter determined whether the character sought to be typed appeared dark, light, or not at all on the typed sheet. Those machines which have come onto the market during the past few years have used keyboards wherein the bad typing habits, such as the one finger hunt and punch system, acquired by the child in using them have been harmful when he later started learning to properly use a standard typewriter. Such machines were also undependable, short lived, and commonly lacked means for uniformly spacing the letters appearing in a typed line, so that a crude typing job was the best that could be expected. It was a knowledge of these difficulties and problems as well as a recognition of the need of a low priced, durable and satisfactorily operable toy typewriter for children's use which led to the conception and development of the present invention.

Accordingly among the objects of the present invention is the provision of a simplified, and yet positive acting and relatively durable toy typewriter.

Another object of the present invention is the provision of a dial operated toy typewriter.

Another object is to provide an electric typewriter having an operating dial and a trigger operated electric switch, which is actuatable through the operation of said dial, for initiating the typing action.

Another object is to provide a dial controlled electric typewriter utilizing a solenoid for imparting substantially uniform typing pressure for each character to be typed.

Another object is to provide a finger actuatable dial geared to a shaft carrying a rotary type wheel, said type wheel carrying shaft being rotatably supported on a pivotally mounted frame with said frame adapted to be actuated so as to move the type wheel carried thereby to and from the platen roller of the typewriter.

Another object is to provide a finger actuatable dial with a ratchet disk joined thereto for fixed rotation with it, and a trigger member pivotally mounted in position to be engaged during the actuation of said dial, said trigger member having an extending dog for engaging said ratchet disk and through it controlling the further movement of said trigger in step with the further rotation of said dial.

A further object is to provide an electric toy typewriter wherein same not only has a dial adapted for actuation by means of a finger in the dial opening showing the character to be typed, but such actuation will bring the finger up against a pivoted trigger member which not only has a dog which engages and actuates a ratchet disk at the back of the dial for uniformly spacing letters in the typed line, but also has an arm which actuates an electric switch which closes an electric circuit and causes the typing of the desired character in uniform printing alignment at the proper time.

A further object is to provide an electric typewriter having a finger actuatable dial with two concentric circular rows of equally spaced finger receiving openings showing characters to be typed, and wherein there is a double trigger, a portion of which is adapted to be engaged from either row of openings, and which controls the exact point at which the typing takes place as well as the spacing of the characters in a typed line, regardless of which row of openings show the corresponding character being typed.

A further object is to provide an electric typewriter having an electric switch, a finger actuatable dial with uniformly spaced openings therein, a ratchet disk rigidly fastened to said dial and a trigger assembly adapted to be engaged and operated when the operator's finger in one of said openings comes up against and actuates it, said trigger assembly having a trigger engageable with a tooth of said ratchet disk and an arm for actuating said switch, the further rotation of said dial, after said trigger has moved sufficiently to cause said trigger to engage a tooth of said ratchet, automatically operating said switch.

A further object is to provide a finger actuatable dial operated electric toy typewriter with a switch adapted to be automatically actuated when the dial has been moved to desired typing position, said switch closing an electric circuit to a solenoid which moves an operating link endwise to cause a type wheel to type the character indicated by the dial at the trigger operating position, and at the same time to actuate an escapement mechanism so that when the type wheel returns to starting position the carriage will have moved endwise one typed character space ready for typing the next character.

A further object is to provide an electric toy typewriter utilizing a solenoid with operating link for moving a type wheel through typing motion when actuated, said link engaging an escapement bar in the course of such typing motion, with said escapement bar having a limit stop which permits said type wheel to type a character and then move away from the platen roller a short distance even though the solenoid remains energized.

A further object is to provide an electric toy typewriter utilizing a solenoid with operating link for moving a type wheel through typing motion when actuated, said operating link having a cam portion at its upper end for actuating a ribbon vibrator to move the ribbon into typing position each time the solenoid is actuated, and allowing said ribbon vibrator to retract and withdraw said ribbon after each actuation so that the typing can be read.

A still further object is to provide one of the ribbon spools with a ratchet disk frictionally joined thereto, and a ratchet operating member actuated to rotate said spool a short angular distance each time a character is typed.

Still further objects and advantages of the invention will appear as the description proceeds.

To the accomplishment of the foregoing and related ends, the invention, then, consists of the typewriter means hereinafter fully described and particularly pointed out in the claims, the annexed drawings and the following description setting forth in detail certain means for carrying out the invention, such disclosed means illustrating, however, but one of the various ways in which the principle of the invention may be used.

In the annexed drawings:

Figure 1 shows a front view of the electric toy typewriter of the present invention.

Figure 2 shows a vertical section taken substantially at line 2—2 of Figure 1 looking in the direction of the arrows, but with certain of the parts shown unsectioned for clarity of illustration.

Figure 3 shows a diagrammatic fragmentary top view of a simplified ribbon vibrator and ribbon feed adapted for use in the toy typewriter of the present invention.

Figure 4 shows a top view of a preferred form of finger actuatable dial with a portion of same broken away to show the ratchet disk and some of the details of the trigger assembly.

Figure 5 shows a front view of the trigger assembly as seen in Figure 1, but with the dial and other parts removed from the housing for clarity of illustration.

Figure 6 shows the switch assembly which is within the housing of the electric toy typewriter directly behind the trigger assembly and in position to be actuated by it.

Figure 7 shows a fragmentary sectional view illustrating the pivotal mounting of the type wheel frame on the main frame of the assembly.

Figure 8 shows an enlarged rear end view of the escapement lever and pivoted escapement dog mounted on same.

Referring more particularly to Figures 1 and 2 of the drawings, it will be noted that the toy typewriter has a housing 1 on the upper face of which is mounted a main frame member 2 which carries signal bell 3 at its rear end. The forward portion of frame 2 preferably extends upward and backward at an angle of approximately 45° with a spacer 4 rigidly fastened to dial shaft 10 in conventional manner as by means of cotter pin 18. Frame member 2, above this spacer 4, is preferably formed with a longitudinal center recess 5 thus providing upwardly extending side arms 6 and 7, Figure 3, the upper portion of each of which is bent to horizontal position and then extended sidewise to form ribbon spool supports 8 and 9.

Mounted on dial shaft 10 directly under and adjacent main frame 2 is bearing washer 19 which is held in place by cotter pin 11 which thus holds dial shaft 10 from being pulled upward through main frame 2. The upper end of dial shaft 10 is threaded for engagement with nut 12 following the placing of bevel gear 13, ratchet disk 14, washer 15, and dial 16 thereon. Each of these members which are threaded on dial shaft 10 has a central opening of suitable size to closely fit shaft 10. Bevel gear 13, ratchet disk 14, washer 15, and dial 16 are also provided with aligned openings, in addition to said central opening, for the reception of a pin 17 which holds all of them in fixed position relative to each other, while pin 20 passes through the hub portion of gear 13 and shaft 10 to hold all of these parts from rotating on said shaft. The lower end of shaft 10 preferably passes through a suitable close fitting opening in frame 2 which furnishes additional support and stability for the assembly.

Ratchet disk 14 is provided with a downturned tab 21 which acts in conjunction with the outer end of pivot member 22, on which is mounted pulley 23, to stop the ratchet disk at its normal starting position. Wrapped around pulley 23 is a dial return spring 24, one end of which is anchored to main frame 2 by means of pin 25, while the other end is anchored to the eye of cotter pin 18 so that as the dial is rotated this spring 24 wraps around spacer 4 to provide spring tension to return the dial to starting position when released.

Main frame 2 at opposite sides of bevel gear 13 is provided with a pair of substantially parallel ears 26 and 27, Figure 7. Pivotally mounted on these ears 26 and 27, by means of shoulder rivets 30 anchored thereto, is a type wheel frame 28 which has a pair of upturned ears 29 parallel to and closely fitting inside of ears 26 and 27. These ears 29 are provided with suitable coaxial perforations to fit and freely rotate on the shoulder portion of said rivets.

Type wheel frame 28, Figure 2, is provided with two downturned ears 31 and 32 which are perforated to form bearings for type wheel shaft 33. This shaft has a bevel gear 34 mounted thereon and anchored in place by means of pin 39, while the other end of this shaft is provided with a type wheel 35 having uniformly spaced projecting type members, said type wheel being anchorable in adjusted typing synchronization with dial 16 by means of a set screw 36. Type wheel frame 28 is held in its normal or uppermost position by means of springs 37 which are fastened at their upper end to main frame 2 by means of pins 38 while the lower end of these springs are conventionally anchored to type wheel frame 28 below ears 29 to obtain maximum frame lifting leverage. Extending from the under face of type wheel frame 28 near the upper end of same and formed from part of same with an opening therethrough for shaft 33 is a downwardly and rearwardly projecting member 141 with arms 40 which are provided with loops 41 at their lower end for the reception of a cotter pin 42 which extends between them.

Mounted on housing 1 at its front edge directly below dial 16 is an outwardly projecting pivot pin 43 on which is mounted a trigger assembly 44. The main trigger 45 of this trigger assembly has its upper arm extend sufficiently across dial 16 so that by placing one's finger in one of the holes of the inner circle of same and rotating the dial in clockwise direction, as seen in Figures 1 and 4, such finger will come up against the upper portion of this main trigger and cause same to rotate in counterclockwise direction about pivot pin 43. This main trigger has a base portion 46. Figure 2, which extends down toward housing 1 and then turns upward once more substantially parallel to the finger contacting portion of such main trigger. This latter upwardly extending portion is perforated to receive pivot pin 43 and thus stabilize trigger assembly 44 in its oscillatory rotary movements.

The upper end of this upwardly extending portion of the trigger assembly behind dial 16 has two arm members with one being bent forward to form dog 47 adapted to engage the teeth of ratchet disk 14 for a purpose to be hereinafter explained. The other arm 49, which is the switch operator, extends through slot 48 in housing 1 with such slot preferably being of a length such that it provides operable limits for the oscillatory rotary movements of the trigger assembly 44. This arm 49, as is more clearly shown in Figure 6, is connected by a mild tension spring 50 to the lower end of bolt 51 at one end of switch 52 which is also anchored to housing 1 at its opposite end by means of bolt 53. The movement of switch operating arm 49 in trigger operating direction, which is to the left as seen in Figure 6, causes the lower end of this switch operating arm to engage operating arm 54 of switch 52 and close the electric circuit through same for a purpose to be hereinafter described.

Since dial 16 is anchored to ratchet disk 14 for rotation in unison therewith due to pin 17, it will be noted that when the operator's finger is in one of the character openings in the inner circle of holes the rotation of dial 16 will carry ratchet disk 14 and its teeth 55 with it; and when main trigger 45 is engaged and moved in counterclockwise direction, as seen in Figure 4, this will bring dog 47 upward and into engagement with the approaching face of the nearest tooth 55 of ratchet disk 14. As soon as this engagement has taken place, then further rotation of the dial 16 will move main trigger 45 with it, and at a point just short of reaching the end of slot 48 in housing 1 operating arm 54 of switch 52 will close the electric circuit through that switch. It is thus to be seen that main trigger 45 through its dog 47 in engagement with a tooth 55 of ratchet disk 14 and through switch operating arm 49 will close electric switch 52 at positively spaced intervals so that in typing, as will be hereinafter explained, the spacing between letters will be substantially identical.

In operating dial 16 from one of the openings of the outer circle, it will be noted that when the operator's finger reaches main trigger 45 there is only a relatively short travel of the finger and the main trigger before the switch closing position is reached. This is due to the relatively short distance from pivot pin 43 out main trigger 45 to where the operator's finger would normally contact the trigger when operating from the outer circle of character openings, as compared with the longer distance of travel where operation is from the inner circle of character openings. This short travel, where operation is in connection with the outer circle of character openings, does not give sufficient movement of main trigger 45 to place dog 47 in front of the proper, and normally next, oncoming tooth 55 of ratchet disk 14. In order to overcome this situation an auxiliary trigger 56 is used and such trigger closely fits between the front and back faces of the inner portion of main trigger 45 with such auxiliary trigger 56 also pivotally mounted for independent movement on pivot pin 43. Auxiliary trigger 56 has a forwardly projecting arm 57 adapted to be contacted by the operator's finger before same reaches the main trigger 45. This arm 57 which is perforated for pivot pin 43 extends slightly below that pin then crosswise and back upward to form a rear arm 58 which is also perforated for pivot pin 43. This arm 58 is connected by means of a tension spring 59 to main trigger 45 just below dog 47 thereof to hold arm 57 in forward finger contacting position which is limited by contact with base 46 of main trigger 45, as is clearly shown in Figure 4. It is thus to be seen that when dial 16 is operated by a finger or the like inserted in one of the character openings of the outer circle, arm 57 will be contacted first and it, through its connection to the main trigger by tension spring 59, which is stiffer than tension spring 50, will cause main trigger 45 to start moving and to bring dog 47 into contact with the advancing face of the adjacent tooth 55 of ratchet disk 14 following which further movement of dial 16 in the same direction will operate the trigger assembly and actuate switch 52 at the prescribed point necessary for uniform spacing of characters in a typed line. Tension spring 59 is sufficiently mild so that once dog 47 has engaged with a tooth 55, arm 57 can move forward under the outer arm of main trigger 45 and allow that trigger to carry the remaining force of the operator's finger when switch operating arm 49 comes up against the end of slot 48 in housing 1.

Mounted inside of housing 1 is a solenoid bracket 60,

Figure 2, on which is supported solenoid 61 which has a moving armature 62 with upwardly extending substantially parallel arms 63 closely fitting on opposite sides of solenoid operating link 64 and pivotally connected thereto by means of cotter pin 65. The upper end of solenoid operating link 64 is provided with a suitable opening 66 through which passes cotter pin 42 which is firmly held in place in loops 41 on the adjacent ends of arms 40 which extend downward and backward from type wheel frame 28.

A power supply cable 67, Figure 2, extends to switch 52 where one of the wires 68 uses the switch to close the circuit through same while the other wire 69 passes unbroken to solenoid 61. Thus with switch 52 closed, one wire of cable 67 connects through that switch and wire 68 to and through solenoid 61 and back through wire 69 of cable 67 thus completing the circuit. With the circuit closed and solenoid 61 activated, armature 62 will be magnetically moved down to the top of solenoid 61, and through its connection to solenoid operated link 64, will through its engagement with type wheel frame 28 by means of arms 40 and cotter pin 41, move type wheel 35 downward so as to strike platen 70 or a sheet of paper (not shown) gripped between that platen and paper deflector 71 with the paper in position for receiving typed characters. As soon as main trigger 45 is released so as to open switch 52, springs 37 will lift type wheel frame 28 and thus return type wheel 35 to starting position.

Mounted on ribbon spool support 9, Figures 1 and 3, is a ribbon spool 72 rotatable about pivot member 73. This ribbon spool 72 is provided with a knob 74 for use in rewinding ribbon 75 after same has been wound on spool 76 which is rotatably mounted on ribbon spool support 8 by means of pivot member 77. Freely and rotatably mounted between spool 76 and ribbon spool support 8 is a small ratchet disk 78 with the adjacent faces of said ratchet disk 78 and spool 76 being provided with friction surfaces, such as a cloth disk glued to the ratchet disk and another cloth disk to the bottom of the spool, so that they will normally rotate together but yet either can be rotated independently of the other.

In order to advance the ribbon a short distance each time a character is typed, a ribbon feed mechanism is required. That mechanism can be of many forms and perhaps one of the most simple for operation with the present machine involves placing an opening 79, Figure 2, in the upper end of solenoid operated link 64 and then connecting into that opening a ratchet operating dog 80, Figure 3, with its operating point engaging the teeth of ratchet disk 78. In order to hold this ratchet operating dog in mesh with those teeth, a very mild tension spring 81 is connected at one end to ratchet operating dog 80 and at its other end to the eye of a cotter pin 82. With the ratchet operating mechanism thus connected, each time the solenoid is operated to move solenoid operating link 64 downward it will push ratchet operating dog 80 endwise to rotate ratchet disk 78 and then upon reverse movement of link 64 will cause the point of ratchet operating dog 80 to engage another tooth on ratchet disk 78 ready for further movement the next time the solenoid is actuated. With the adjacent surfaces of the ratchet disk and ribbon spool frictioned, this will rotate the spool slowly and thus feed the ribbon from spool 72 onto spool 76. If it is not noticed when all of the ribbon has been transferred so that the ribbon comes to a standstill with the end of same anchored to spool 72 in conventional manner, no injury will come to the mechanism for the simple reason that the frictionally joined surfaces between ratchet disk 78 and spool 76 will allow the ratchet disk to rotate independent of the spool. This same friction factor will also allow the rewinding of the ribbon back on spool 72 by rotating the latter through the aid of knob 74 all without the necessity of disengaging anything to permit this reverse winding.

Mounted on the upper end of main frame 2, Figure 2, and over platen 70 on the typing side of same is a pair of paper guides 83 which hold the sheet of paper being typed close to the platen 70 at opposite sides of the point at which the typing impression takes place. In order to readily see the typing as same progresses, it is necessary to provide a ribbon vibrator 84, Figures 2 and 3, having slots 85 and 86 through which ribbon 75 is threaded and must travel as it passes from one spool to the other. This ribbon vibrator has a crossbar 87 and at the ends of said crossbar are guide slots 88 and 89 through which pass screws 90 and 91 which in turn threadedly engage ribbon spool supports 8 and 9 while leaving the ribbon vibrator free to move. Springs 92 and 93 normally hold ribbon vibrator 84 in retracted position with the forward ends of slots 88 and 89 up against screws 90 and 91. The upper end of solenoid link 64 has a forwardly projecting arm 94 the under face of which inclines toward platen 70 and upward so as to form a cam surface adapted to engage crossbar 87 of ribbon vibrator 84 so that each time the solenoid is actuated to pull solenoid link 64 downward, this cam surface of the under face of arm 94 will, by cam action, move the ribbon vibrator 84 toward platen 70 against the tension of springs 92 and 93 to carry ribbon 75 into position to be struck by typewheel 35 during the printing motion of same. When the electric circuit to the solenoid is opened, the upward movement of solenoid link 64 allows springs 92 and 93 to retract ribbon vibrator 84 to starting position and to uncover the typing so that same can be seen.

The carriage 95 has a bottom member 96, Figure 2, with a conventional escapement rack 97 on its forward edge, while its ends 98 and 99, Figure 1, are turned up at right angles to the bottom member and perforated for the reception of shaft 100 which forms the concentric axis of platen 70 which is preferably rubber covered in accordance with standard practice. Paper deflector 71 is fastened at its bottom to carriage bottom member 96 in conventional manner such as by spot welding. Carriage end member 98 has an outturned ear 101 from which extends a spring detent 102 adapted to engage the notched periphery of disk member 103, fixedly carried by shaft 100, so as to uniformly space the typed lines. On the opposite end of shaft 100 is mounted knob 104 which is used to manually rotate platen 70. The lower forward edges of carriage end members 98 and 99 are joined by means of a carriage rail 105 which may be fastened thereto by means of screws 106 and 107. Brackets 108 and 109, mounted on housing 1 by means of bolts 110 and 111, are respectively provided with rollers 112 and 113 which contact bottom member 96 near its rear edge to provide support for the carriage when it is extended in either direction from the substantially central position shown in Figure 1.

At opposite sides of main frame 2 are a pair of like upstanding brackets 114, one of which is shown in Figure 2. These brackets are both provided at their upper end with top and bottom rollers 115 and 116 in contact with the top and bottom edges of carriage rail 105, while the upright side portions of these brackets 114 extending between the corresponding ends of rollers 115 and 116 limit the front and back movement of the carriage due to carriage rail 105 passing between them. The rear portion of the carriage bottom member 96 is supported on roller 117 which is rotatably supported on bolt 118 which fastens signal bell 3 substantially at the center of the upturned rear end of main frame 2, as shown in Figure 2. This upturned rear end of main frame 2 has its upper edge turned forward to form a stop ear 119 to hold carriage bottom member 96 in free but close contact with roller 117 and thus complete the stabilization of the carriage 95.

Escapement lever 120, Figure 2, is pivotally mounted by means of bolt 121 on bracket 122 extending up from main frame 2, preferably forward of solenoid operated link 64 so that escapement operating motion of the escapement lever only requires a small angular movement of same. Tension spring 123 connected to the upper front end of escapement lever 120 and to main frame 2 by means of cotter pin 142 applies sufficient force to escapement lever 120 to resiliently hold its rear end normally elevated for conventional escapement operation. The rear end of escapement lever 120, Figure 8, is turned sidewise to form a bracket end 124 on which escapement dog 125 may be freely pivoted by means of shoulder screw 126. This dog 125 has an escapement rack engaging member 146, which is bendable for adjustment purposes, and a forwardly extending bottom bracket 147 which forms a stop for escapement dog 125 by contact with the bottom edge of bracket end 124 of escapement lever 120. Tension spring 148, which connects bottom bracket 147 to escapement lever 120, holds rack engaging member 146 ready at all times to engage and hold escapement rack 97 while leaving rack engaging member 146 free to retract when the carriage is to be returned to starting position. Projecting upward and then backward over the upper edge of escapement rack 97, Figure 2, from escapement lever 120 is a fixed escapement dog 127, the end of which is adapted to engage the teeth of escapement rack 97 in conventional manner when the rear end of escapement lever 120 is moved downward under typical escapement actuation. When the rear end of escapement lever 120 is lowered with dog 127 in engagement with the teeth of escapement rack 97, the movable escapement dog 125 disengages from the bottom of the teeth of escapement rack 97 so as to permit the tension exerted by tension spring 128 to move the carriage to the left a half space to typing position as viewed in Figure 1, so that when the rear end of escapement lever 120 once more returns to its upper position, escapement dog 125 will reengage the teeth of the escapement rack with the carriage moved endwise another half space so that the total carriage movement is equal to one character space. Pivotally mounted escapement dog 125, as seen in Figure 8, moves counterclockwise to automatically release from the teeth of escapement rack 97 upon movement of the carriage assembly to the right, Figure 1, in accordance with standard escapement mechanism procedure. In order to stabilize and support escapement lever 120, a forked-end bracket 129, which may be struck up from main frame 2, is provided near the end of escapement lever 120 carrying escapement dog 125. The bottom of the fork of this forked-end bracket serves as a limit stop in the downward movement of the escapement lever.

In order to provide blank spaces such as between words, et cetera, a space bar 130, Figure 2, is provided. This space bar is conventionally mounted on a space bar lever 131 which passes through opening 132 in housing 1 and wherein such opening if desired may be provided with cushions 133 and 134, preferably made from rubber, to quiet the action of the space bar when same is operated. Within housing 1 and near the inner end of space bar lever 131, same is provided with a pair of upturned ears 135 adapted to engage by means of a pivot pin 136 a corresponding pair of downturned ears 137 of a bracket 138 conventionally mounted on housing 1 substantially in the position shown in Figure 2. The inner end of space bar lever 131 extends upward through an opening 139 through housing 1 and main frame 2 so that the end of space bar lever 131 may rest against the under face of escapement lever 120 at the end thereof remote from that carrying escapement dog 125. In order to hold the end of space bar lever 131 in firm contact with escapement lever 120, a tension spring 143 may be conventionally fastened to the inner end of space bar lever 131 and to escapement lever 120, for instance in the position shown in Figure 2. It will be seen that, with this construction, depressing space bar 130 will actuate space bar lever 131 and through it escapement lever 120 will be tilted to cause the escapement mechanism to allow the carriage assembly to move to the left, as seen in Figure 1, one character space for each actuation of the space bar. Tension spring 128 which causes this movement of the carriage may be conventionally connected to the under face of the carriage adjacent its right hand end, as diagrammatically illustrated in Figure 1, while the other end of this spring may be anchored to bracket 108 mounted on housing 1 at the left hand end of the assembly.

Solenoid operated link 64, Figure 2, is provided with a downturned actuating arm 140 so that when the solenoid is operated to move link 64 downward, the lower end of this arm will engage the top edge of escapement lever 120 between its pivot and escapement dog 125 to depress the escapement lever and cause it to bottom in the forked-end bracket 129 which thus limits the movement of escapement lever 120 to that required for escapement actuation. At the same time with the downturned actuating arm of solenoid actuated lever in contact with escapement lever 120 and the latter bottomed in forked-end bracket 129, type wheel 35 will preferably be approximately 1/16" to 1/8" above platen 70. With the apparatus constructed in this manner, the sudden and forceful pull of solenoid 61 upon its actuation will forcibly throw type wheel 35 toward platen 70 and when solenoid operated lever 64 reaches the end of its movement, the inertia imparted to the type wheel 35, and the parts on which it is mounted, will cause same to continue its movement and complete the character typing action with cotter pin 42 carried in loops 41 of arms 40 moving down into opening 66 of the solenoid operated lever 64. Springs 37 however immediately retract type wheel 35 and hold it in the noted position just above the platen 70 until the solenoid 61 is de-energized which in turn allows springs 37 to again return type wheel 35 back to its initial starting position. This procedure it has been found produces uniform typing action and avoids the blurring of typed characters which tests indicated to be inherent under alternating current operation if the type wheel was held firmly against the platen during the whole time that the solenoid was energized.

Bell 3, Figure 2, has a conventional bell clapper 144 which extends forward through the upstanding back portion of main frame 2 and then upward with its upper end in position to engage a clapper operator 145 carried by bottom member 96 of the carriage assembly near the right hand end of same to indicate, by ringing the bell, that the edge of the typed line is close at hand.

Where the alphabet from A to Z is to be used along with the numerals 2 to 9, and a comma and period, this totals to thirty-six characters. Since dial 16 has two blank spaces to provide dial movement necessary to operate, it is as though dial 16 carried thirty-eight characters and accordingly bevel gear 13 may be provided with thirty-eight teeth. However, since there are only thirty-six characters to be typed, those thirty-six characters will be placed with uniform spacing and in proper order on the periphery of type wheel 35. These thirty-six characters accordingly only require thirty-six teeth on bevel gear 34 in mesh with the thirty-eight teeth on bevel gear 13 to handle the thirty-six characters on dial 16. The invention, however, is not limited to a mechanism for typing thirty-six characters since obviously more or less characters can be used and the mechanism synchronized to meet that situation. It is also clear that any order or position of the characters on dial 16 may be used so long as the type is placed at the proper point on the type wheel for typing when the corresponding character on the dial 16 is at the point where printing actuation takes place.

Other modes of applying the principle of my typewriter invention may be employed instead of the one explained, change being made as regards the mechanism herein disclosed, provided the means stated by any of the following claims or the equivalent of such stated means be employed.

I therefore particularly point out and distinctly claim as my invention:

1. A typewriting mechanism, which comprises a main frame, a shaft rotatably mounted in fixed location on said main frame at the forward end of same, a dial mounted on said shaft for rotation therewith, said dial indicating in proper location the characters to be typed, a trigger, engageable means at each character indicated on said dial, said engageable means facilitating rotation of said dial and actuation of said trigger, a carriage at the rear end of said main frame and having a platen roller and escapement rack as part of same, means for supporting and guiding said carriage while permitting same to be moved in endwise direction, an escapement mechanism cooperating with said escapement rack on said carriage, resilient means applying endwise moving force to said carriage, a type wheel carrying projecting character type in the order and spacing corresponding with the order and operative spacing of said characters on said dial, a type wheel frame pivotally mounted in operative position on said main frame, a shaft carried by said type wheel frame, said shaft having said type wheel mounted thereon for rotation therewith, means connecting said first named shaft with said shaft carrying said type wheel so that rotation of said first shaft correspondingly rotates said type wheel carrying shaft, a solenoid, a solenoid operated link, means connecting said solenoid operated link to said type wheel frame for moving said type wheel into typing relation with said platen when said solenoid is actuated, and an electric switch for closing the electric circuit to said solenoid, the actuation of said trigger closing said electric switch with resultant operation of the solenoid and movement of the type wheel to type the character indicated by the character on said dial adjacent said trigger at the time of its actuation.

2. A typewriting mechanism as set forth in claim 1, wherein said engageable means consists of a wall portion at each character indicated on the dial, said wall portion being engageable by the operator's finger for rotating said dial until his finger engages and operatively actuates said trigger.

3. A typewriting mechanism as set forth in claim 1, wherein said means for connecting the first shaft carrying the dial to the second shaft carrying the type wheel consists of a pair of bevel gears.

4. A typewriting mechanism as set forth in claim 1, wherein said means for connecting the solenoid operated link to the pivotally mounted type wheel frame consists of a forked-end member projecting from the type wheel frame and extending on opposite sides of said solenoid operated link, and a pivot member passing through a suitable opening in said solenoid operated link, said pivot member being carried and supported by said forked-end member.

5. A typewriting mechanism as set forth in claim 1, wherein said escapement mechanism has an escapement lever with a fixed dog and a movable dog pivotally mounted thereon, said dogs being in position to operably engage the escapement rack of said carriage.

6. A dial operated typewriter wherein said dial has recesses in its face adapted for the insertion of the end of the operator's finger for rotating the dial and with each of said recesses not only indicating a character to be typed but also having their operating edges spaced from each other an equal angular distance or multiple of same, which comprises a main frame, a shaft rotatably mounted in fixed location on said main frame at the forward end of same, a bevel gear, ratchet disk, and said operating dial all concentrically mounted on said shaft in fixed position relative to each other, a trigger extending over the face of said dial in position to be actuated by the operator's finger when the latter is inserted in one of said recesses and used to rotate said dial and operate said trigger, a carriage at the rear end of said main frame and having a platen roller and escapement rack as part of same, means for supporting and guiding said carriage while permitting same to be moved in endwise direction, an escapement mechanism cooperating with said escapement rack on said carriage, spring means applying pressure to move said carriage endwise in typing direction, a type wheel carrying projecting character type in the order and spacing corresponding with the order and operative spacing of said characters on said dial, a type wheel frame pivotally mounted in operative position on said main frame, a shaft carried by said type wheel frame, a bevel gear anchored in fixed position on one end of said shaft, said type wheel being adjustably fastened on the other end of said shaft, said bevel gears operatively meshing so that said dial and said type wheel will rotate in fixed relation to each other, a solenoid, a solenoid operated link, means connecting said solenoid operated link to said type wheel frame for moving said type wheel into typing relation with said platen when said solenoid is actuated, and an electric switch for closing the electric circuit to said solenoid, the actuation of said trigger closing said electric switch with resultant operation of the solenoid and movement of the type wheel to type the character indicated by the character on said dial adjacent said trigger at the time of its actuation.

7. A dial operated typewriter as set forth in claim 6, wherein said means for connecting the solenoid operated link to the pivotally mounted type wheel frame consists of a forked-end member projecting from the type wheel frame and extending on opposite sides of said solenoid operated link, and a pivot member passing through a suitable opening in said solenoid operated link, said pivot member being carried and supported by said forked-end member.

8. A dial operated typewriter as set forth in claim 6, wherein said escapement mechanism has an escapement lever with a fixed dog and a movable dog pivotally mounted thereon, said dogs being in position to operably engage the escapement rack of said carriage.

9. A dial operated typewriter as set forth in claim 6, wherein said escapement mechanism has an escapement lever, a pivot for said escapement lever in position to facilitate the cooperation of one end of said lever with the escapement rack on the carriage, a fixed dog on one end of said escapement lever with said dog having its rack engaging point normally above said rack, resilient means engaging said escapement lever for normally holding said fixed dog above said rack, a movable dog, means for pivotally mounting said movable dog on said escapement lever in cooperative relation with said fixed dog and rack, spring means for holding said movable dog in position to engage said rack from its under side and hold said carriage while permitting space by space movement of the latter in typing direction upon actuation of said escapement lever, said movable dog also permitting free return of the carriage to starting position.

10. A dial operated typewriter as set forth in claim 6, wherein said escapement mechanism has an escapement lever as part of same, and wherein said solenoid operated link has a member adapted to engage said escapement lever and depress same when said solenoid is actuated and to release same at the end of the solenoid actuation period, whereby the escapement mechanism will move through a complete cycle of operation.

11. A dial operated typewriter as set forth in claim 6, wherein there is a pivot means on which said trigger is mounted, and wherein said trigger has both a dog for engaging said ratchet disk and a switch operating arm, whereby rotation of said dial with said dog in engagement with said ratchet disk keeps said dial in step with the movement of said switch operating arm to accurately time the operation of said switch and with it the typing motion.

12. A dial operated typewriter as set forth in claim 6, wherein said dial has two concentric rows of recesses alternately spaced with those of one row intermediate of those of the other and having the operating edges of the recesses spaced from each other an equal angular distance or a multiple of same, a pivot means on which the trigger is mounted, said trigger being of multiple construction having a main trigger and an auxiliary trigger, said main trigger extending over the front of said dial so as to be operable from the inner row of recesses, said main trigger having both a dog for engaging said ratchet disk and a switch operating arm so that rotation of said dial to operate said trigger from the inner row of recesses will, through said main trigger, cause said dog to engage said ratchet disk and keep said dial in its further rotary travel in step with the movement of said switch operating arm to accurately time the typing actuation of the assembly, said auxiliary trigger also being mounted on said pivot means carrying said main trigger but movable to a limited extent independent of said main trigger, said auxiliary trigger being of a length limiting it to operation from the outer row of recesses, and resilient means for holding said auxiliary trigger extending forward from said main trigger toward the first recess of said outer row and yet permitting same to move under said main trigger at the end of its travel, whereby said auxiliary trigger, upon being contacted during rotation of said dial, acts to first move said main trigger to bring the dog thereof into engagement with said ratchet disk whereupon further movement of said dial actuates the switch operating arm as before.

13. A dial operated typewriter as set forth in claim 6, wherein there is a ribbon vibrator mounted on said main frame, means for guiding said ribbon vibrator to carry the typewriter ribbon in front of and away from said platen roller, resilient means for normally holding said ribbon vibrator in retracted position, and cam means on said solenoid operated link for moving said ribbon vibrator to carry the typewriter ribbon in front of said platen roller each time said solenoid is operated.

14. A dial operated typewriter as set forth in claim 6, wherein there are ribbon spools mounted on said main frame in front of said platen roller and at opposite sides of said type wheel frame, a ratchet disk frictionally connected to one of said spools, a ratchet operating dog engaging said ratchet disk, and connecting means for actuating said ratchet operating dog each time the solenoid actuated link is moved endwise by said solenoid.

15. In an electrically operated typewriter, a dial having operating elements on its face as part of same, said operating elements being spaced from each other an equal angular distance or a multiple of same, a ratchet disk anchored to said dial for equal angular movement therewith, said ratchet disk having teeth thereon spaced at the same angular distance apart as the operating elements on said dial, an electric switch for actuating said typewriter in its typing motion, a trigger, and a pivot means for said trigger, said trigger extending over said operating elements on the face of said dial and having both a dog for engaging a tooth of said ratchet disk and a switch operating arm, whereby rotation of said dial with said dog in engagement with a tooth of said ratchet disk keeps said dial in step with the movement of said switch operating arm of the trigger to accurately time the operation of said switch and with it the typing motion.

16. In an electrically operated typewriter, a dial having operating elements on its face as part of same, said operating elements being spaced from each other an equal angular distance or a multiple of same, a ratchet disk anchored to said dial for equal angular movement therewith, said ratchet disk having teeth thereon spaced at the same angular distance apart as the operating elements on said dial, shaft means for rotatably mounting said dial and ratchet disk, an electric means for actuating said typewriter in its typing motion, an electric switch for closing the electric circuit to said electric means for actuating said typewriter, a trigger, and a pivot means for said trigger, said trigger having a portion extending over said operating elements on the face of said dial in position to be actuated, said actuatable portion of said trigger having mechanical means in conjunction therewith, said mechanical means having a dog for engaging a tooth on said ratchet disk, and a switch operator, whereby actuating said trigger through rotation of said dial first moves said dog into engagement with a tooth of said ratchet disk and further movement of said dial moves said switch operator to accurately time the closing of said switch and with it the typing motion.

17. In an electrically operated typewriter, a rotary dial having on its face two concentric rows of operating elements alternately spaced with those of one row intermediate with those of the other, said operating elements of said concentric rows being spaced from each other an equal angular distance or a multiple of same, a ratchet disk mounted on said dial for equal angular movement therewith, said ratchet disk having teeth thereon spaced at the same angular distance apart as the operating elements on said dial, shaft means for rotatably mounting said dial and ratchet disk, an electric means for actuating said typewriter in its typing motion, an electric switch for closing the electric circuit to said electric means for actuating said typewriter, a trigger, pivot means on which said trigger is mounted, said trigger being of multiple construction having a main trigger and an auxiliary trigger, said main trigger extending over the front face of said dial so as to be directly operable from the inner row of said operating elements, said main trigger having as unit parts of same both a dog for engaging said teeth of said ratchet disk and a switch operating arm so that rotation of said dial to operate said trigger from said inner row of operating elements will through said main trigger cause said dog to engage a tooth of said ratchet disk and keep said dial in its further rotary travel in step with the movement of said switch operating arm to accurately time the typing actuation of the typewriter, said auxiliary trigger also being mounted on said pivot means carrying said main trigger but movable to a limited extent relative to and independent of said main trigger, said auxiliary trigger being of a length limiting it to operation from the outer row of the operating elements on said dial, and resilient means connecting said auxiliary trigger to said main trigger so that said auxiliary trigger extends forward of said main trigger toward the first operating element of said outer row of said dial, whereby actuation of said dial from said outer row of operating elements will first contact said auxiliary trigger and through it bodily move said main trigger so as to bring the dog thereof into engagement with a tooth of said ratchet disk and upon further movement of said dial said resilient means permits said auxiliary trigger to move into parallelism with said main trigger following which further movement of said main trigger will actuate the switch operating arm as before.

18. In an electrically operated typewriter, a rotary dial having in its face two concentric rows of recesses alternately spaced with those of one row intermediate of those of the other and having the operating edges of the recesses spaced from each other an equal angular distance or a multiple of same, a ratchet disk anchored to said dial at the under face of same for equal angular movement therewith, said ratchet disk having teeth on its periphery spaced at the same angular distance apart as the operating edges of said recesses on said dial, an electric switch for actuating said typewriter in its typing motion, a trigger, and a pivot means on which said trigger is mounted, said trigger being of multiple construction having a main trigger and an auxiliary trigger, said main trigger extending over the front face of said dial so as to be operable from the inner row of said recesses, said main trigger having both a dog for engaging said teeth of said ratchet disk and a switch operating arm so that rotation of said dial to operate said trigger from said inner row of recesses will through said main trigger cause said dog to engage a tooth of said ratchet disk and keep said dial in its further rotary travel in step with the movement of said switch operating arm to accurately time the typing actuation of the typewriter, said auxiliary trigger also being mounted on said pivot means carrying said main trigger but movable to a limited extent independent of said main trigger, said auxiliary trigger being of a length limiting it to operation from the outer row of recesses, and resilient means connecting said auxiliary trigger to said main trigger for holding said auxiliary trigger extending forward from said main trigger toward the first recess of said outer row of recesses in said dial and yet permitting said auxiliary trigger to move under said main trigger extending over the front of said dial at the end of the travel of said auxiliary trigger, whereby said auxiliary trigger, upon being actuated during rotation of said dial, acts to first move said main trigger to bring the dog thereof into engagement with a tooth of said ratchet disk whereupon further movement of said dial actuates the switch operating arm as before.

19. In a dial operated typewriter, a main frame, a shaft rotatably mounted in fixed location on said frame, anchoring means for holding said dial in fixed position on said shaft, a bevel gear fixedly mounted on said shaft for rotation therewith, a type wheel frame, pivot means for pivotally mounting said type wheel frame on said main frame, a second bevel gear and a second shaft fixedly joined together, said second shaft being rotatably mounted on said type wheel frame, a type wheel on the outer end of said second shaft, said bevel gears meshing with each other in operable manner throughout the pivotal operating range of said type wheel frame, and resilient means joined to said type wheel frame and to said main frame for resiliently supporting the former while allowing same to be moved through its pivotal operating range.

20. In a character-indicating-dial operated typewriter, a main frame, a shaft rotatably mounted in fixed location on said frame, anchoring means for holding said dial in fixed position on said shaft, a bevel gear fixedly mounted on said shaft for rotation therewith, a type wheel frame, pivot means for pivotally mounting said type wheel frame on said main frame, a second bevel gear and a second shaft fixedly joined together, said second shaft being rotatably mounted on said type wheel frame, a type wheel on the outer end of said second shaft, said bevel gears meshing with each other in operable manner throughout the pivotal operating range of said type wheel frame, resilient means joined to said type wheel frame and to said main frame for resiliently supporting the former while allowing same to be moved through its pivotal operating range, a solenoid, a solenoid operated link, pivot means for joining said solenoid operated link to said type wheel frame, an electric circuit connected to said solenoid, a normally open electric switch in said electric circuit, a trigger having an arm extending over said dial in position to be engaged and actuated during the rotation of said dial from the upper face of same at the indicated characters to be typed, a pivot mounting for said trigger, and resilient means for normally holding said trigger in retracted position, said trigger having an arm for operating said electric switch when said trigger is actuated, whereby said solenoid is operated and said type wheel frame pivotally moved to actuate said type wheel.

References Cited in the file of this patent

UNITED STATES PATENTS

| Number | Name | Date |
|---|---|---|
| 681,957 | Ennis | Sept. 3, 1901 |
| 1,577,869 | Podolsky | Mar. 23, 1926 |
| 1,890,619 | Lowitz | Dec. 13, 1932 |
| 2,002,075 | Berger | May 21, 1935 |